(12) United States Patent
McDonald et al.

(10) Patent No.: US 11,673,835 B2
(45) Date of Patent: Jun. 13, 2023

(54) SUSTAINABLE TWO-COMPONENT ANNULAR GROUT COMPOSITION AND METHOD FOR USE WITH A TUNNEL-BORING MACHINE

(71) Applicant: PQ, LLC, Malvern, PA (US)

(72) Inventors: Michael McDonald, Toronto (CA); Kelly Paul Short, O'Fallon, MO (US); Kenneth A. Berg, North Wales, PA (US); Flavio Ernesto Ribeiro, Plainfield, IL (US); Jim Moran, Philadelphia, PA (US); Peter Marinescu, Toronto (CA); Daoping Guo, Ontario (CA)

(73) Assignee: PQ, LLC, Malvern, PA (US)

( * ) Notice: Subject to any disclaimer, the term of this patent is extended or adjusted under 35 U.S.C. 154(b) by 24 days.

(21) Appl. No.: 17/588,942

(22) Filed: Jan. 31, 2022

(65) Prior Publication Data

US 2022/0274881 A1    Sep. 1, 2022

Related U.S. Application Data

(60) Provisional application No. 63/154,134, filed on Feb. 26, 2021.

(51) Int. Cl.
| | |
|---|---|
| *C04B 28/26* | (2006.01) |
| *C04B 18/06* | (2006.01) |
| *C04B 7/02* | (2006.01) |
| *C04B 14/10* | (2006.01) |
| *C04B 111/70* | (2006.01) |

(52) U.S. Cl.
CPC ............. *C04B 28/26* (2013.01); *C04B 7/02* (2013.01); *C04B 14/106* (2013.01); *C04B 18/061* (2013.01); *C04B 2111/70* (2013.01)

(58) Field of Classification Search
CPC ......... C04B 28/26; C04B 7/02; C04B 14/106; C04B 18/061; C04B 2111/70; C04B 2111/00724; C04B 28/006
See application file for complete search history.

(56) References Cited

FOREIGN PATENT DOCUMENTS

| JP | 6719154 B2 | 7/2020 | |
|---|---|---|---|
| KR | 10-1999297 B1 | * 7/2019 | ........... C04B 14/104 |

OTHER PUBLICATIONS

International Search Report for PCT/US2022/017810 dated Jun. 20, 2022.
Written Opinion of the International Searching Authority for PCT/US2022/017810 dated Jun. 20, 2022.
"Effects of High CaO Fly Ash and Sulfate Activator as a Finer Binder for Cementless Grouting Material" by Lee, Jaehyun and Lee, Taegyu; Published Nov. 7, 2019; Materials 2019, 12,3664; doi: 10.3390/ma12223664; www.mdpi.com/journal/materials.
"An investigation of the microstructure and durability of a fluidized bed fly ash-metakaolin geopolymer after heat and acid exposure", Ping Duan, et al., Materials and Design 74 (2015) 125-137; www.elsevier.com/locate/matdes; Published by Elsevier Ltd.

* cited by examiner

*Primary Examiner* — Anthony J Green
(74) *Attorney, Agent, or Firm* — Buchanan Ingersoll & Rooney PC

(57) ABSTRACT

A method and composition are provided for backfilling the annular gap created as a tunnel boring machine advances through the ground. The fill material is comprised of two components that are combined and mixed together just prior to entering the annular gap. The first component is non-cement slurry consisting of a fluidized bed combustion ash such as coal ash. The second component consists of an alkali silicate such as sodium silicate. Additionally, ordinary Portland cement and/or metakaolin can be added to the grout composition.

14 Claims, 1 Drawing Sheet

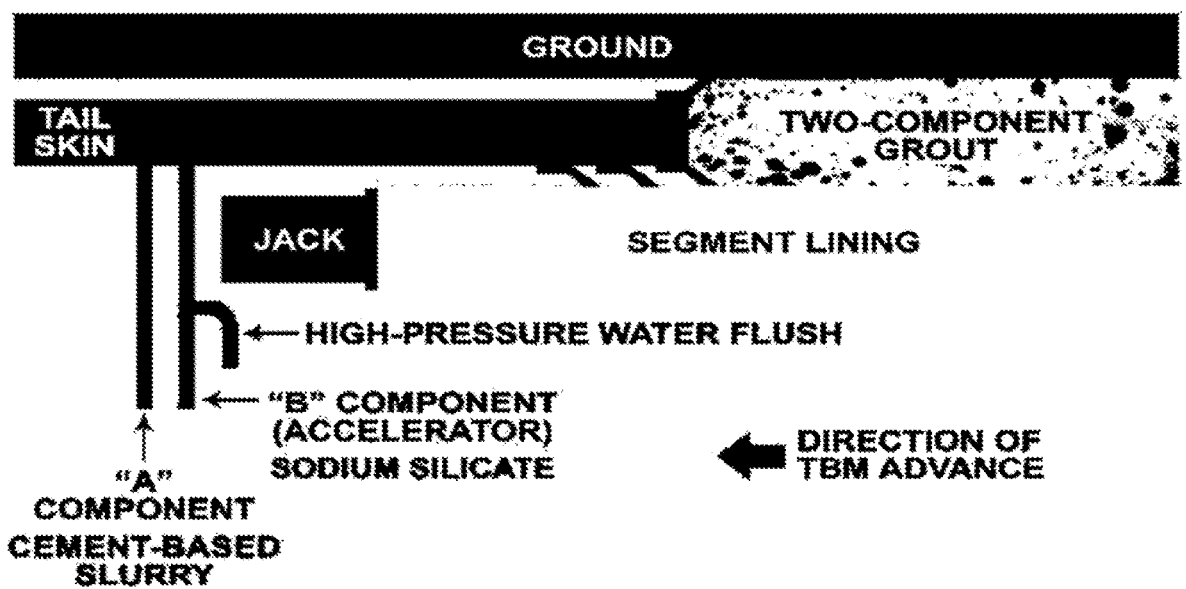
(PRIOR ART)

SUSTAINABLE TWO-COMPONENT ANNULAR GROUT COMPOSITION AND METHOD FOR USE WITH A TUNNEL-BORING MACHINE

BACKGROUND OF THE INVENTION

Field of the Invention

The present disclosure relates to the field of boring and, more particularly, backfilling the annular gap space created by a tunnel-boring machine as it advances through the ground.

Background of the Related Art

Tunnels like those found for subways, automobiles or large diameter pipes are typically constructed using a tunnel-boring machine. The tunnel boring machine offers several advantages in tunnel construction and is usually the only acceptable tunnel construction method in dense urban areas. Most often, the use of a tunnel boring machine is the most cost effective method.

As shown in FIG. 1, the nature of tunnel construction with the tunnel boring machine requires the boring diameter be larger than the tunnel segments. This creates the critical need to immediately and uniformly fill the annular space to avoid ground subsidence and to support concrete tunnel segments. Once set, the backfill grout must provide long-term protection of the tunnel. The fill material or grout has an extensive list of requirements concerning slurry design, set times as well as short and long term material properties. Given the very large volume requirements for large tunneling projects, it is critical that the grout material also be a reasonable cost and meet high health and safety standards.

Since the introduction of tunnel boring machine technology, grout material has evolved, with the current technology of choice being the two-component grout. The literature describes the merits of the two-component grouts compared with other backfilling technology. The paper by Peila, D., Borio, L. & Pelizza, S. 2011, *The behaviour of a two-component backfilling grout used in a Tunnel-Boring Machine*. ACTA GEOTECHNICA SLOVENIKA (A 1: 5-15. ISSN 1854-0171, is a leading article on the subject. This paper details the material properties of the set grout and presents the composition and properties of different two-component-grout systems. The examples of composition and material properties are dictated by the requirements for the tunnel design as well as cost and availability of material. The components can be summarized as:

Component "A"—cement, bentonite, water, retardant/dispersant

Component "B"—sodium silicate

Component "A" or the cement slurry is prepared above ground in a mixing station. The solids content of the slurry varies but typically range from 30 to 40% by weight with the majority of all of the solids coming from ordinary Portland cement. A minor amount of aluminosilicate material such as fly ash can be added to the slurry to help lower cost, improve sustainability and can be used to extend gel times. Fly ash volume must be kept as a minor component to avoid unacceptable loss of compressive strength and excessively long gel times.

Once prepared, the cement-based slurry may be pumped several kilometers before reaching the tunnel boring machine face. This requires the slurry to have a low viscosity and be resistant to solids settling (i.e. bleeding). As it is common for the tunnel boring machine to have downtime for repair and maintenance, the slurry must be resistant to chemical and material change over a 24 to 72 hour period.

Component "B" or accelerator is mixed with the cement-based slurry just prior to placement into the annular space. Component "B" is usually an approximately 3.2 ratio sodium silicate. The typical dosage rate of sodium silicate to cement slurry is approximately 5 to 10% wt/wt per hardened material. Once the components are mixed together, the low viscosity grout begins to form a stiff gel in under a minute. The gel then develops strength and within an hour to form a solid that has sufficient strength to allow the tunnel boring machine to move forward by pushing against the liner segments.

Ordinary Portland cement has several outstanding material properties but has inherent deficiencies in brittleness, durability, adhesion to rock and metal as well as acid and fire resistance. Of increasing concern is the sustainability of using ordinary Portland cement due to its massive carbon footprint. Annual production of cement produces approximately 8% of global anthropogenic $CO_2$ emissions and consumes approximately 2-3% of the global energy supply.

It is known that aluminosilicate powders such as Class C fly ash, Class F fly ash, ground granulated blast furnace slag, pumice and metakaolin can be reacted with an alkali source such as sodium silicate and/or sodium hydroxide as well as their potassium counterparts to create a cement alternative. These cement alternatives are referred by different names including geopolymers, inorganic polymers, and alkali-activated aluminosilicates, among others. These materials offer a much lower carbon footprint and better sustainability compared to ordinary Portland cement. Sustainability is higher if the alkali-activated aluminosilicate material is formulated with a by-product material such as fly ash generated from burning of coal for power generation or slag from the steel making process.

Material properties and characteristics of geopolymer and other types of aluminosilicate materials are dependent on formulation, reaction conditions such as temperature and raw material selection. Under the right conditions, these materials can have comparable compressive strengths as ordinary Portland cement with the following enhancements;
  improved durability;
  greater adhesion to metal and rock;
  possessing self-healing properties;
  less brittle; and
  fire & acid resistance.

Alkali-activated aluminosilicate materials, and geopolymer materials in particular, have several drawbacks that have limited their use as a cement alternative. Some of the limitations include but are not limited to: long set times; slow development of strength; requirement for heat; high solids levels; high rheology; and the requirement for high levels of alkalinity. To address these limitations the preferred aluminosilicate sources are amorphous rather than crystalline and therefore more reactive to the alkali source (e.g. fly ash, blast furnace slag, metakaolin). A further hindrance to commercial adoption is cost. Fly ash and ground granulated blast furnace slag are no longer viewed as waste material but as valuable products for cement blends and geopolymers.

The above-mentioned limitations have limited the use of cement alternatives as a drop-in replacement for existing two component-cement based grouts. While aluminosilicate materials such as geopolymers can have desirable compressive strength and durability, they also need to meet the requirements for low viscosity, viscosity stability over an extended period of time and have short gelation times. Any replacement system must also function within the confines of existing tunnel boring machine equipment. Finally, the material needs to provide a consistent performance and be cost competitive to cement-based annular grout systems. These deficiencies were unexpectedly solved by using a fluidized bed combustion coal ash.

The properties of fluidized bed coal ash differ considerably from class C & F fly ash obtained from pulverized coal combustion. Class C & F ash is produced from burning bituminous and subbituminous coal at high temperatures (~1300° C.-1700° C.). The resulting ash is spherical with a glassy, amorphous structure. Fluidized bed coal ash typically uses a low grade coal ash and is burned at 800° C.-900° C. where limestone or dolomite form part of the bed. As well as improving combustion efficiency, the limestone or dolomite acts as a sorbent for sulfur emissions from the coal or other fuel sources. The resulting ash is a crystalline, irregular shaped powder. Fluidized bed combustion ashes are variable in their chemical composition as well as the shape, size and surface area of the ash material. If limestone is used as the bed material the calcium levels as CaO can range from ~10% to 40% by weight of the ash material. Properties of fluidized bed combustion ash are impacted by the source of fuel which is typically coal but also biomass such as wood and agriculture waste.

Prior art shows the solidification of fluidized bed combustion ash to make geopolymers. Japanese patent JP 6719154 discloses a low-calcium fluidized bed combustion ash solidification method, in which low-calcium fluidized-bed combustion ash is added to an active filler and an alkaline solution and kneaded, and cured. The resulting product is described as a solidified geopolymer.

The geopolymer described in JP 6719154 would have suitable compressive strength to be used as an annular grout material. However, the time to form the geopolymer at ambient conditions precludes the use of such a geopolymer as a two-component annular grout. The current invention uses a fluidized bed combustion ash with greater than 10% CaO coal ash as the aluminosilicate source. The initial reaction is not a geopolymerization reaction but rather involves the reaction of alkali silicate with sufficiently available calcium in conjunction with the particle characteristics of the fluidized bed combustion ash. The irregular shape and porosity of the fluidized bed combustion ash also allows suitable slurry properties.

BRIEF SUMMARY OF THE INVENTION

The invention results in a quick setting grout that permanently fills and seals the annular gap between the tunnel boring machine and the ground.

It has been discovered that slurries of a fluidized bed combustion ash, when combined with sodium silicate, offer a novel and unexpected method and material for backfilling the annular gap created by a tunnel boring machine. Furthermore, slurries made with fluidized bed combustion ash have the necessary gel times, rheology and stability characteristics to be a substitute for cement-based material. Once the slurry is combined with an aqueous alkali silicate, the mixture can quickly set and develop sufficient early and final compressive strength to create a permanent seal. The need to customize slurry properties, gel times and compressive strength can be addressed by minor additions of lime, gypsum, ordinary Portland cement and other aluminosilicate sources such as blast furnace slag and metakaolin. The incorporation of these additives can also be used to adjust for the variable nature of fluidized bed combustion ash. Slurry and material properties can also be adjusted by increasing/decreasing solids level and/or adjusting mixing procedures (i.e. high shear vs. low shear mixing). Similar to cement-based grouts the slurry properties can also be adjusted with admixtures such as retarders and superplasticizers, among others.

The composition and method provides a much lower carbon footprint over current grout technology based on cement. The composition can be made and run using existing equipment and set-up commonly used with existing two-components grouts based on ordinary Portland cement.

A grout composition for filling a tunnel annulus is disclosed which comprises a slurry of fluidized bed combustion ash; and an aqueous alkali metal silicate. The aqueous alkali metal silicate can be either sodium silicate and/or potassium silicate. Preferably, the aqueous alkali metal silicate is sodium silicate and the concentration of the sodium silicate rangers from 5-20 wt %. Preferably, the fluidized bed combustion ash includes calcium hydroxide. Alternatively, the grout composition can further include ordinary Portland cement and/or metakaolin.

In use, the grouting of a tunnel annulus is performed by mixing a slurry of fluidized bed combustion ash and an aqueous alkali metal silicate, and immediately applying that mixture into a tunnel annulus.

BRIEF DESCRIPTION OF THE DRAWINGS

FIG. 1 is a schematic representation of a tunnel boring machine and the annulus created thereby.

DETAILED DESCRIPTION OF THE INVENTION

While the present invention will be described with reference to the following ingredients, it will be understood by those skilled in the prior art that various changes may be made and equivalents may be substituted without departing from the scope of the invention. In addition, many modifications may be made to adapt a particular situation or material to the teachings of the invention without departing from the essential scope thereof. It is therefore intended that the present invention not be limited to the particular embodiments disclosed as the best mode contemplated for carrying this invention, but that the invention will include all embodiments and legal equivalents thereof which are within the scope of the appended claims.

The present invention provides a method and composition for backfilling the annular gap surrounding a tunnel produced by a tunnel boring machine. Fluidized bed coal ash that can be used for the compositions and methods for this invention are generated from the burning of coal and/or biomass or waste. The preferred fluidized bed coal ash is crystalline and contains at least 10% calcium oxide. These fluidized bed coal ashes are commercially available in large quantities as by-product from power generation. It is apparent that other types of fluidized bed ash generated from other sources such as agricultural waste or wood can be potential sources of material.

The fluidized bed coal ash is made into slurry using water. Bentonite can be added to the water to improve suspension properties and prevent solids from settling. Bentonite is typically used with cement-based grouts for improved rheology characteristics. The option exists to use other suspension agents or a combination of these suspension agents with bentonite. Examples of suitable suspension agents include polysaccharide-type viscosifiers such as guar gum, welan gum or xanthan gum, as well as other commonly used synthetic viscosifiers such as polyacrylates. The slurry properties can be further improved via the addition of certain admixtures such as retarders and dispersants. These type of admixtures are commonly used in cement-based grouts to improve performance.

The slurry is set using a water-soluble alkali silicate. Soluble silicates are produced with varying degrees of alkalinity as measured by the ratio of $SiO_2$ to $Me_2O$ where Me is the alkali metal and is most commonly sodium or potassium. Table 1 lists several grades of alkali silicate made by PQ Corporation that can be used for this application. Generally, sodium silicate is the preferred form of alkali silicate for reasons of cost. For cost and to reduce hazardous exposure to high alkalinity, higher ratio sodium silicates have the advantage over low ratio silicates. For geopolymers, the preferred sodium silicate is a low ratio sodium and/or a higher ratio sodium silicate that is combined with sodium or potassium hydroxide.

TABLE 1

| PQ Corporation Product Name | $SiO_2/Me_2O$ | % $SiO_2$ | % $Me_2O$ | % Solids | |
|---|---|---|---|---|---|
| Potassium Silicates | | | | | |
| KASIL ® 1 | 2.5 | 20.8 | 8.3 | 29.1 | Liquid |
| KASIL ® 6 | 2.1 | 26.5 | 12.65 | 39.15 | Liquid |
| EcoDrill ® K45 | 3.0 | 18.0 | 6.0 | 24.0 | Liquid |
| KASOLV ® 16 | 1.6 | 52.8 | 32.5 | 85.3 | Hydrous powder |
| KASIL ® SS | 2.5 | 71.0 | 28.4 | 99.4 | Ground Glass |
| BW ™ 50 | 1.60 | 26.2 | 16.75 | 42.55 | Liquid |
| BJ ™ 120 | 1.80 | 23.7 | 13.15 | 36.85 | Liquid |
| D ™ | 2.00 | 29.4 | 14.7 | 44.1 | Liquid |
| RU ™ | 2.40 | 33.0 | 13.9 | 47.1 | Liquid |
| M ® | 2.58 | 32.1 | 12.4 | 44.5 | Liquid |
| K ® | 2.88 | 31.7 | 11.0 | 42.7 | Liquid |
| N ® | 3.22 | 28.7 | 8.9 | 37.6 | Liquid |
| N38 ® | 3.22 | 26.4 | 8.2 | 34.6 | Liquid |
| EcoDrill S45 | | | | | Liquid |
| SS ® 20 | 3.22 | 75.0 | 23.3 | 99.2 | Ground glass |
| G ® | 3.22 | 61.8 | 19.2 | | Hydrous powder |
| GD ® | 2.00 | 54.0 | 27.0 | | Hydrous Powder |
| Metso Beads ® 2048 | 1.00 | 47.0 | 51.0 | | Granule |
| Other Silicates | | | | | |
| Lithisil ® 25 | 8.2 | 20.5 | 2.5 | 23.0 | Liquid lithium silicate |

TABLE 1-continued

| PQ Corporation Product Name | $SiO_2/Me_2O$ | % $SiO_2$ | % $Me_2O$ | % Solids | |
|---|---|---|---|---|---|
| EcoDrill ® AAAS | 1.7 | 27.9 | 16.2 | 45.7 | Aqueous alkali alumino silicate |

EXAMPLE 1

A fluidized bed coal slurry is compared against similar formulated slurries using a range of aluminosilicate powder sources set forth in Table 2 below. The class F and C fly ash meet ASTM C618 requirements for use in "Standard Specification for Coal Fly Ash and Raw or Calcined Natural Pozzolan for Use in Concrete" and ground granulated blast furnace slag conforms to ASTM C989, "Standard Specification for Slag Cement for Use in Concrete and Mortar".

TABLE 2

| | Weight |
|---|---|
| Component A | |
| Aluminosilicate powder* | 460 g |
| Bentonite | 10 g |
| Water | 750 g |
| Retarder | 5 g |
| Component B | |
| N ®38 Sodium Silicate | 200 g |

*fluidized bed coal ash, Class C fly ash, Class F fly ash, Ground blast furnace slag, Pumice, Metakaolin The first set of tests evaluates initial slurry viscosity and then viscosity at 24 hrs using ASTM D6910 (Marsh® Funnel). Later examples determined "Marsh seconds" using a Coulette rheometer and measuring the viscosity at a shear rate of $1000\ s^{-1}$. The viscosity reading is converted to "Marsh seconds" using the indicated equation Marsh seconds=viscosity/slurry density+25

To measure the tendency of slurry to settle solids and segregate (i.e. bleed), the slurries are tested using ASTM C940.

The slurry is mixed with N38® grade of sodium silicate, a widely used grade of sodium silicate for cement based grouts. The concentration of the sodium silicate can range from approximately 5% to 20% weight to weight of hardened material. Gel times are measured by rapidly stirring the mix and recording the time when the mixture rapidly develops viscosity. Compressive strength is measured according to ASTM C109.

The results of these tests are presented in Table 3 below.

TABLE 3

| Test | Typical Values | Fluidized Bed Coal Ash | Class C Fly Ash | Class F Fly Ash | Ground Blast Furnace Slag | Pumice | Metakaolin |
|---|---|---|---|---|---|---|---|
| Flow - (slurry A) | | | | | | | |
| initial | <60 s | 38 s | 34 s | 32 s | 34 s | 34 s | 34 s |
| 24 hr | | 67 s | 34 s | 34 s | 34 s | 35 s | 36 s |
| Bleed | <10% | | | | | | |
| 1 hr | | 3.1% | 3.8% | 16.3% | 3.1% | ~25% | 10.6% |

TABLE 3-continued

| Test | Typical Values | Fluidized Bed Coal Ash | Class C Fly Ash | Class F Fly Ash | Ground Blast Furnace Slag | Pumice | Metakaolin |
|---|---|---|---|---|---|---|---|
| 24 hrs | | 10.0% | 28.8% | 38.8% | 30.0% | 53.8% | 31.9% |
| Gel Time | 8-60 s | 36 s | >60 min | >60 min | >60 min | >60 min | 18 s |
| Compressive Strength | | | | | | | |
| 1 hr (24 hr slurry) | >0.15 MPa | 0.28 MPa | 0 | 0 | 0 | 0 | 0.0064 MPa |
| 1 day | >0.7 MPa | 1.14 MPa | Soft gel | Soft gel | Soft gel | Settled | 0.24 MPa |

The results of this experiment show that the use of fluidized bed coal ash provides a slurry with properties similar to a cement-based slurry currently used by industry. When the slurry is combined with sodium silicate, it provides the required set time and compressive strength. The results also indicate that this is unique to fluidized bed coal combustion ash. In contrast to ground granulated blast furnace slag the fluidized bed coal ash had a significantly lower level of CaO.

EXAMPLE 2

Using a different source of fluidized bed coal ash, Component "A" was formulated according to Example 1 and set forth in Table 2 above.

Component "B' was changed to evaluate the impact of different sources of alkali on the setting and material properties when combined with Component "A". Example 2 compares the commonly used N®38 grade of sodium silicate with 8 M NaOH, 2.64 M NaOH, 1:1 mix of N®38, and a 1:1 mix by weight of 8 M NaOH and 2.64 M NaOH mixed with N®38 sodium silicate. The molarity of 2.64 NaOH was selected to closely match the $Na_2O$ level present in N®38 sodium silicate.

Example 2 demonstrates suitable gel times and compressive strength properties can only be achieved using sodium silicate vs. sodium hydroxide or a mixture of sodium silicate and sodium hydroxide.

EXAMPLE 3

Depending on the end-user there will be a need to customize properties such as gel times and compressive strength. Example 3 demonstrates that minor additions of calcium hydroxide, calcium sulfate dihydrate (gypsum) or ordinary Portland cement. Other sources of aluminosilicate such as ground granulated blast furnace slag and metakaolin may be added to the blend with no adverse effect. The incorporation of these additives can also be used to adjust for the variable nature of fluidized bed combustion ash. In the case of gypsum it was noted that it had a thinning effect on viscosity. Ordinary Portland cement can be incorporated as a minor component to shorten gelation times and further improve compressive strength.

Tables 5a and 5b look at the impact soluble sources of calcium, ordinary Portland cement (OPC) and metakaolin and ground granulated blast furnace slag (GGBFS) on slurry properties, such as gelation time and compressive strength. These materials were added at a concentration of 2.17% and 5% on a weight to weight basis with cement.

TABLE 4

| Run | Control | 8M NaOH | 2.64M NaOH | 1:1 N38:8M NaOH | 1:1 N38:2.64M NaOH |
|---|---|---|---|---|---|
| Component A | | | | | |
| Fluidized Bed Coal Ash (g) | 460 g | 460 g | 460 g | 460 g | 460 g |
| Water (g) | 750 g | 750 g | 750 g | 750 g | 750 g |
| Retarder(g) | 5 g | 5 g | 5 g | 5 g | 5 g |
| Bentonite (g) | 10 g | 10 g | 10 g | 10 g | 10 g |
| Component B | | | | | |
| N®38 sodium silicate | 200 g | 0 g | 0 g | 100 g | 100 g |
| 8M NaOH | 0 g | 200 g | 0 g | 100 g | 0 g |
| 2.64M NaOH | 0 g | 0 g | 200 g | 0 g | 100 g |
| Gel time | 39 s | >1 hr | >1 hr- | ~6':50" Not a sharp set | ~12':30" Not a sharp set |
| Compressive strength | | | | | |
| Str @ 1 hour | 0.27 MPa | 0 MPa | 0 MPa | 0 MPa | 0 MPa |
| Str @ 1 Day | | 0 MPa | 0 MPa | 0.02 MPa | 0.01 MPa |

TABLE 5a

| Run | Control | Lime | Gypsum | OPC | Metakolin | GGBFS |
|---|---|---|---|---|---|---|
| Component A | | | | | | |
| Fluidized Bed Coal Ash (g) | 460 g | 450 g | 450 g | 450 g | 450 g | 450 g |
| Ca(OH)$_2$ (g) | 0 g | 10 g | 0 g | 0 g | 0 g | 0 g |
| Gypsum | 0 g | 0 g | 10 g | 0 g | 0 g | 0 g |
| OPC | 0 g | 0 | 0 | 10 g | 0 | 0 |
| Metakaolin | 0 g | 0 | 0 | 0 | 10 g | 0 |
| Ground granulated blast furnace slag | 0 g | 0 | 0 | 0 | 0 | 10 g |
| Water (g) | 750 g | 750 g | 750 g | 750 g | 750 g | 750 g |
| Retarder (g) | 5 g | 5 g | 5 g | 5 g | 5 g | 5 g |
| Bentonite (g) | 10 g | 10 g | 10 g | 10 g | 10 g | 10 g |
| Component B | | | | | | |
| N ®38 sodium silicate | 200 g | 200 g | 200 g | 200 g | 200 g | 200 g |
| Gel time | 34 s | 18 s | 21 s | 27 s | 29 s | 34 s |
| Viscosity | | | | | | |
| Initial viscosity | 40 s | 41 s | 36 s | 40 s | 40 s | 39 s |
| 1 day viscosity | 78 s | 87 s | 49 s | 86 s | 84 s | 81 s |
| Bleed | | | | | | |
| 1 hour | 1.1% | 1.1% | 2% | 1.6 s | 1.4 s | 1.2 s |
| 24 hour | 2.1% | 1.9% | 12.2% | 2.5 s | 2.2 s | 2.6 s |
| Compressive strength | | | | | | |
| Str @ 1 hour | 0.17 MPa | 0.25 MPa | 0.18 MPa | 0.20 MPa | 0.17 MPa | 0.15 MPa |
| Str @ 1 Day | 0.81 MPa | 0.78 MPa | 0.84 MPa | 0.93 MPa | 0.93 MPa | 1.11 MPa |

TABLE 5b

| Run | Control | Gypsum | Cement | Metakaolin | Slag |
|---|---|---|---|---|---|
| Component A | | | | | |
| Fluidized bed coal ash (g) | 460 g | 437 g | 437 g | 437 g | 437 g |
| Gypsum | 0 | 23 g | 0 | 0 | 0 |
| Cement | 0 | 0 | 23 g | 0 | 0 |
| Metakaolin | 0 | 0 | 0 | 23 g | 0 |
| Slag (Seattle) | 0 | 0 | 0 | 0 | 23 g |
| Water (g) | 750 g | 750 g | 750 g | 750 g | 750 g |
| Retarder (g) | 5 g | 5 g | 5 g | 5 g | 5 g |
| Bentonite (g) | 10 g | 10 g | 10 g | 10 g | 10 g |
| Component B | | | | | |
| N ®38 sodium silicate | 200 g | 200 g | 200 g | 200 g | 200 g |
| Gel time | 34 s | 16 s | 28 s | 30 s | 32 s |
| Viscosity | | | | | |
| Initial viscosity (s) | | 37 s | 41 s | 41 s | 41 s |
| 1 day viscosity (s) | | 51 s | 82 s | 83 s | 81 s |
| Bleed | | | | | |
| 1 hour | | 1.6% | 1.1% | 1.5% | 1% |
| 24 hour | | 12.1% | 1.9% | 1.4% | 2.3% |
| Compressive strength | | | | | |
| Str @ 1 hour | 0.21 MPa | 0.23 MPa | 0.25 MPa | 0.18 MPa | 0.17 MPa |
| Str @ 1 Day | | 0.96 MPa | 1.14 MPa | 1.25 MPa | 0.99 MPa |

EXAMPLE 4

For tunnels that require higher compressive strength values and/or shorter gelation times can be achieved by the addition of Portland cement to the slurry mix. Slurry properties, gel times and compressive values are still in line with cement-based grouts. The addition of ordinary Portland cement is still a minority of the solid component "A". Example 4 shows that similar loadings of ordinary Portland cement in a slurry composed of ground granulated blast furnace slag or Metakaolin did not yield a product with acceptable 1 hour and 1 day compressive strength. In the case of the metakaolin slurry, it gelled after 24 hours and the ground granulated blast furnace slag had unacceptably high level of bleed.

TABLE 6

|  | Control | Fluidized Bed Coal Ash + OPC | Metakaolin + OPC | Slag + OPC |
|---|---|---|---|---|
| Component A | | | | |
| Fluidized bed coal ash C (g) | 460 g | 345 g | 0 | 0 |
| Metakaolin | 0 | 0 | 345 g | 0 |
| Slag | 0 | 0 | 0 | 345 g |
| OPC | 0 | 115 g | 115 g | 115 g |
| Water (g) | 750 g | 750 g | 750 g | 750 g |
| Retarder (g) | 5 g | 5 g | 5 g | 5 g |
| Bentonite (g) | 10 g | 10 g | 10 g | 10 g |
| Component B | | | | |
| N®38 sodium silicate | 200 g | 200 g | 200 g | 200 g |
| Gel time | 41 s | 27 s | 84 s | 19 s |
| Viscosity | | | | |
| Initial viscosity | 36 s | 37 s | 39 s | 33 |
| 2 day viscosity | 66 s | 56 s | gel | 39 s |
| Bleed | | | | |
| 1 hour | 1.2% | 1.6% | <1% | 4.9% |
| 48 hour | 6.9% | 13.2% | <1% | 23.8% |
| Compressive strength | | | | |
| Str @ 1 hour | 0.16 MPa | 0.36 MPa | 0.02 MPa | 0.02 MPa |
| Str @ 1 Day | 0.93 MPa | 1.32 MPa | 0.05 MPa | 0.57 MPa |

EXAMPLE 5

Example 5 demonstrates that gel times can also be controlled by adjusting the volume of sodium silicate added to the slurry of fluidized bed coal combustion ash as a slurry of fluidized bed coal combustion ash blended with ordinary Portland cement.

TABLE 7a

| Run | 5 wt % silicate dosage | 7.5 wt % silicate dosage | 14 wt % silicate dosage | 19.7 wt % silicate dosage |
|---|---|---|---|---|
| Component A | | | | |
| Fluidized Bed Coal Ash (g) | 460 g | 460 g | 460 g | 460 g |
| OPC | 0 | 0 | 0 | 0 |
| Water (g) | 750 g | 750 g | 750 g | 750 g |
| Retarder (g) | 5 g | 5 g | 5 g | 5 g |
| Bentonite (g) | 10 g | 10 g | 10 g | 10 g |
| Component B | | | | |
| N®38 Sodium Silicate | 68 g | 100 g | 200 g | 300 g |
| Gel time | 4 s | 13 s | 37 s | 52 s |

TABLE 7b

| Run | 7.5 wt % silicate dosage | 14 wt % silicate dosage | 19.7 wt % silicate dosage |
|---|---|---|---|
| Component A | | | |
| Fluidized Bed Combustion Ash (g) | 345 g | 345 g | 345 g |
| OPC | 115 g | 115 g | 115 g |
| Water (g) | 750 g | 750 g | 750 g |
| Retarder (g) | 5 g | 5 g | 5 g |
| Bentonite (g) | 10 g | 10 g | 10 g |
| Component B | | | |
| N® 38 sodium silicate | 100 g | 200 g | 300 g |
| Gel time | 6 s | 25 s | 36 s |

The annular grout of the present invention is used in connection with a tunnel boring machine. The properties of the grout such as strength at one hour and gel time are important characteristics for such a grout. There is a need for a quick gel time and relatively high strength at one hour to enable the progress of the tunnel boring machine in the tunneling process to proceed at a commercially acceptable rate.

Although the description above contains certain specificities, they should not be interpreted as limitations to the scope of the invention, but as an example of a preferred embodiment of the same. Therefore, the scope of the present invention must not be determined by the embodiments illustrated, but by the attached set of claims and its legal equivalents.

The invention claimed is:

1. A grout composition for filling a tunnel annulus comprising:
   a. a slurry of fluidized bed combustion ash; and
   b. an aqueous alkali metal silicate,
wherein the ratio of aqueous alkali material metal silicate to fluidized bed combustion ash is in the range of 0.2 to 0.55.

2. The grout composition of claim 1, wherein said aqueous alkali metal silicate is at least one of sodium silicate and potassium silicate.

3. The grout composition of claim 2, wherein said aqueous alkali metal silicate is sodium silicate and the concentration of said sodium silicate ranges from 5-14 wt % of the total grout composition.

4. The grout composition of claim 1, wherein said fluidized bed combustion ash includes calcium hydroxide.

5. The grout composition of claim 1 further comprising ordinary Portland cement.

6. The grout composition of claim 1 further comprising metakaolin or ground granulated blast furnace slag.

7. The grout composition of claim 1, wherein said slurry of fluidized bed combustion ash further includes bentonite, the ratio of bentonite to fluidized bed combustion ash being less than 0.05.

8. A method of grouting a tunnel annulus comprising the steps of:
   a. mixing a slurry of fluidized bed combustion ash and an aqueous alkali metal silicate; and
   b. immediately applying said mixture into said tunnel annulus, wherein the ratio of aqueous alkali material metal silicate to fluidized bed combustion ash is in the range of 0.2 to 0.55.

9. The method of claim 8, wherein said aqueous alkali metal silicate is at least one of sodium silicate and potassium silicate.

10. The method of claim 9, wherein said aqueous alkali metal silicate is sodium silicate and the concentration of said sodium silicate ranges from 5-14 wt % of the total grout composition.

11. The method of claim 8, wherein said fluidized bed combustion ash includes calcium hydroxide.

12. The method of claim 8, wherein said slurry further includes ordinary Portland cement.

13. The method of claim 8, wherein said slurry further includes metakaolin or ground granulated blast furnace slag.

14. The method of claim 8, wherein said slurry of fluidized bed combustion ash further includes bentonite, the ratio of bentonite to fluidized bed combustion ash being less than 0.05.

* * * * *